United States Patent
Giraudet

(10) Patent No.: US 8,474,979 B2
(45) Date of Patent: Jul. 2, 2013

(54) PRODUCTION OF CUSTOMIZED PROGRESSIVE OPHTHALMIC LENS

(75) Inventor: Guillaume Giraudet, Charenton le Pont (FR)

(73) Assignee: Essilor International (Compagnie Generale d'Optique, Charenton le Pont (FR)

( * ) Notice: Subject to any disclaimer, the term of this patent is extended or adjusted under 35 U.S.C. 154(b) by 269 days.

(21) Appl. No.: 12/997,557

(22) PCT Filed: Jun. 11, 2009

(86) PCT No.: PCT/FR2009/051096
§ 371 (c)(1),
(2), (4) Date: Dec. 10, 2010

(87) PCT Pub. No.: WO2009/150378
PCT Pub. Date: Dec. 17, 2009

(65) Prior Publication Data
US 2011/0128496 A1    Jun. 2, 2011

(30) Foreign Application Priority Data

Jun. 12, 2008    (FR) ..................... 08 53890

(51) Int. Cl.
*A61B 3/10*    (2006.01)
*A61B 3/14*    (2006.01)
*A61B 3/00*    (2006.01)

(52) U.S. Cl.
USPC ............... 351/246; 351/204; 351/208

(58) Field of Classification Search
USPC ................... 351/200–246, 169, 177
See application file for complete search history.

(56) References Cited

U.S. PATENT DOCUMENTS

| | | | |
|---|---|---|---|
| 4,537,479 A | 8/1985 | Shinohara et al. | |
| 6,886,938 B1 | 5/2005 | Menezes | |
| 7,429,106 B2 * | 9/2008 | Divo et al. | 351/206 |
| 2002/0093639 A1 * | 7/2002 | Haga | 356/4.01 |
| 2003/0123868 A1 * | 7/2003 | Nakano et al. | 396/106 |
| 2003/0143391 A1 | 7/2003 | Lai | |
| 2008/0292141 A1 * | 11/2008 | Yu et al. | 382/106 |

FOREIGN PATENT DOCUMENTS

| | | |
|---|---|---|
| EP | 0 940 117 B1 | 9/1999 |
| EP | 1 591 064 B1 | 11/2005 |
| WO | 01/62139 A1 | 8/2001 |
| WO | 2007/088313 A1 | 8/2007 |

OTHER PUBLICATIONS

Dursteler, J., "Visual Strategy," Inf@Vis!, Jan. 9, 2006, 5 pages. http://www.infovix.net/printMag.php?num=178&lang=2.
Schuldt, S., "Ysis—Naturliches Sehen erleben," Deutsche Optiker Zeitung, 5:38-43, May 1, 2004 (+ Google English Translation).

* cited by examiner

*Primary Examiner* — Mohammed Hasan
(74) *Attorney, Agent, or Firm* — Robert Iannucci; Seed IP Law Group PLLC

(57) ABSTRACT

A method makes a customized progressive ophthalmic lens intended for an identified wearer that includes measurements of the inclination of the wearer's head. These measures are made when the wearer performs visual tasks in far-vision conditions, by consecutively looking horizontally, then towards the ground. A variation of the optical power of the progressive lens, below a reference direction for the far vision, is adjusted on the basis of the measure results. The habituation period of the wearer to the progressive lens can thus be reduced.

25 Claims, 5 Drawing Sheets

PRODUCTION OF CUSTOMIZED PROGRESSIVE OPHTHALMIC LENS

BACKGROUND

1. Technical Field

The present invention relates to the production of a customized progressive power ophthalmic lens, in other words, a progressive power spectacle lens which is intended for an identified wearer.

2. Description of Related Art

Progressive power lenses have been used for many years to correct an ametropy of a wearer in a manner that is suited both to far vision and near vision. For this, the lens has optical power values that are variable along a meridian line, between a reference direction for far vision and a reference direction for near vision. The optical power values for these two reference directions are determined from a prescription which is prepared for the wearer. Usually, the prescription indicates an optical power value for far vision and an addition value. The optical power value of the lens that is appropriate to the wearer to correct his sight in near vision conditions is equal to the sum of the optical power value which is prescribed for far vision and the prescribed addition value. The lens which is supplied to the wearer is produced in such a way as to produce substantially the optical power value which is thus calculated for near vision and the optical power value which is prescribed for far vision, respectively for the two reference directions for near vision and for far vision.

It is known that a progressive power lens exhibits, in a manner which is inherent in its principle, an unintentional astigmatism which may be distributed in lateral regions of the lens, so as to interfere with the vision of the wearer as little as possible. This distribution of the unintentional astigmatism can be performed by favoring a wide channel without astigmatism, between the reference directions for the far and near visions. However, the unintentional astigmatism is then greater towards the lateral edges of the lens. Alternatively, a channel without astigmatism which is narrow makes it possible to reduce the unintentional astigmatism values in the lateral regions of the lens.

It was then proposed to adapt the distribution of the unintentional astigmatism according to the propensity of the wearer to prefer to turn the head or the eyes horizontally when looking successively in two different directions situated at one and the same height. Such an adaptation of the design of the progressive power lens makes it possible to reduce the nuisance to the wearer caused by the unintentional astigmatism. It therefore involved a customization of the progressive power lens according to the wearer, over and above matching the lens to the optical prescription prepared for the wearer.

It is also known to adapt a progressive power lens to suit the vertical movements of the head of the wearer. This is a further customization of the progressive power lens, which is different from the preceding one based the horizontal head movements. The aim of such a customization, which takes account of the changes of inclination of the head in a vertical plane, is to adjust the variation of the optical power of the progressive power lens along the meridian line. In this way, the optical power is adapted to the distance of an object being looked at regardless of the angular height of the direction in which the object is located in front of the wearer. To this end, the document EP 1 591 064 for example proposes a device which makes it possible to determine the variations of inclination of the head of the wearer when looking alternately in the reference direction for far vision and that for near vision.

However, the methods for customizing a progressive power lens proposed before the present invention, to take account of the movements of the head of the wearer in a vertical plane, are limited to near vision conditions. Intermediate vision conditions between the near and far visions are sometimes taken into account. In the context of the present description, near vision conditions correspond to an object being looked at which is situated less than 40 cm (centimeters) from the eyes of the wearer, and far vision conditions correspond to an observation distance which is greater than 120 cm. The customization of the progressive power lens which is done according to some of these prior methods consists in adjusting the height of the reference point for near vision inside the lens. In this way, a possible time for the wearer to become accustomed to the progressive power lens can be reduced.

Furthermore, in these prior customization methods, the wearer is always static in the observation conditions which are reproduced to determine his propensity to favor moving the head or the eyes. In other words, these prior methods for customizing a progressive power lens do not take any account of the movement of the wearer relative to the object being looked at.

Now, it has become apparent that a wearer of progressive power lenses customized for near vision can still be hampered in circumstances which correspond to far vision. The variable visual correction which is obtained by the progressive power lens may in fact be unsuited to the vertical head movements, when the wearer is looking at objects which are distant in the reference direction for far vision and then in variable directions below this reference direction. The result may therefore be a nuisance to the wearer during a period of becoming accustomed to a new progressive power lens.

Furthermore, it has been found that the vertical head movements which are performed by the wearer to look at distant objects, are different when the wearer is immobile or when he is moving. This difference is due to a spontaneous anticipation of the wearer relative to his actual movement. Such behavior occurs, for example, when the wearer is walking in the street and alternately looking at the ground in front of him and at a distant landscape.

BRIEF SUMMARY

One aim of the present invention therefore consists in improving the customization of a new progressive power ophthalmic lens which is supplied to a wearer, notable for the observation of distant objects.

Another aim of the invention is to improve the visual perception, by the wearer, of objects which are situated low down in front of him, in particular objects which are situated in front of him at ground level.

Yet another aim of the invention consists in adapting the progressive power lens to the dynamic behavior of the wearer, that is to say, when he moves around relative to the object which he is looking at.

For this, the invention proposes a novel method for producing a customized progressive power ophthalmic lens which is intended for an identified wearer. This method comprises the following steps:

/a/ for the wearer, obtaining a prescribed optical power value for far vision and a prescribed addition value, a sum of the prescribed optical power value for far vision with the prescribed addition value providing a prescribed optical power value for near vision; and /g/ producing the lens so as to obtain, for the following directions through the lens:
  for the reference direction for far vision: a first optical power value corresponding to the prescribed value for far vision, and
  for the reference direction for near vision: a second optical power value corresponding to the prescribed value for near vision.

The inventive method is characterized in that it also comprises the following steps, performed between the steps /a/ and /g/:

/b/ presenting first visual signals at the wearer's eye height when standing, the first visual signals being adapted to prompt a first visual task;

/c/ for the wearer, walking toward the first visual signals from an initial distance measured horizontally relative to these first visual signals, while performing the first visual task;

/d/ when the wearer arrives at a first distance from the first visual signals, less than the initial distance, presenting second visual signals on the ground between the wearer and the first signals, at a second distance measured horizontally from the first signals and less than the first distance, the second visual signals being adapted to prompt a second visual task, the wearer then switching from the first task to the second task;

/e/ measuring first angles of inclination of the head of the wearer in a vertical plane while said wearer performs the first task then the second task; and /f/ from the first angles of inclination of the head of the wearer measured according to the step /e/ and for a first fixed deviation of the optical power relative to the prescribed optical power value for far vision, the first deviation being less than half the prescribed addition value, determining a first intermediate direction of sight through the lens intersecting the meridian line between the reference direction for far vision and the reference direction for near vision, said first intermediate direction being associated with the prescribed optical power value for far vision added to the first optical power deviation.

The lens is then produced in step /g/ so as to also obtain, for the first intermediate direction determined in the step /f/, a third optical power value corresponding to the prescribed value for far vision added to the first optical power deviation.

Thus, a method according to the invention comprises measurements of the inclination of the head of the wearer, while he performs two visual tasks in succession in different conditions. The lens is then produced, the results of these measurements being taken into account. In this way, the method provides a customization of the lens over and above the prescribed optical specifications.

This additional customization is based on the movements performed by the wearer with his head in a vertical plane. In practice, the first visual signals are presented in front of the wearer, at eye height, whereas the second visual signals are presented on the ground in front of him. Both the direction of his gaze, and the orientation of his face, therefore vary in the vertical plane which passes through the head of the wearer and the first signals.

In the context of the present invention, the expression "visual task" should be understood to mean a deliberate reading of the visual signals which requires the attention of the wearer. Such a task causes the wearer to spontaneously adopt a posture, in particular of his head, which corresponds to his usual behavior for the different positions of the signals. Preferably, the visual signals which are presented are sufficiently large and simple for the corresponding visual task to be able to be executed by the wearer even if he is not fitted with appropriate corrective lenses, or even if he is without corrective lenses.

During the steps /c/ to /e/ of the method, the wearer is placed in far vision conditions. In practice, the initial distance which is necessary for the wearer to adopt a normal walk during these steps is greater than 2 m (meters), preferably greater than 3 m, or, even better, greater than 5 m. It corresponds to the initial distance of observation of the first visual signals. Values for this initial distance between the wearer and the first signals which are greater than 3 m provide enhanced comfort in simulating a real life situation for the wearer. The results of the measurements of inclination of the head of the wearer which are then obtained are more representative of his behavior and his usual postures. The second visual signals are presented on the ground in front of the wearer, which corresponds to an observation distance which is between 1.5 and 3 m, according to the height of the wearer. The latter observation distance therefore also corresponds to far vision conditions.

Finally, the wearer moves during the steps /c/ to /e/ of the method, toward the first and second visual signals. Such a movement reproduces observation conditions which are said to be dynamic, unlike a static posture of the wearer during an attentive observation. Such observation conditions, which are combined with a movement of the wearer toward the object which he is looking at, occur very frequently in everyday life. In this way, the lens which is supplied to the wearer is suited to situations as commonplace as walking along a street.

For these reasons, the progressive power lens which is produced according to the invention provides the wearer with enhanced visual and physical comfort. In particular, it is not necessary for the wearer to modify his postural habits to look at distant objects. Thus, no time is needed for adaptation of the wearer to the new progressive power lens.

By thus taking account of the movements of the head of the wearer, in a vertical plane and for far vision conditions, a method according to the invention makes it possible to adjust the variations of the optical power of the lens below the reference direction for far vision, along the meridian line. In the jargon of those skilled in the art, the start of the progression of the optical power can thus be adjusted, from the reference point on the lens for far vision, toward the reference point for near vision.

This adjustment is made by modifying a direction of sight through the lens, for which the optical power is greater than the first deviation which is fixed, to the value which is prescribed for far vision. This first deviation is less than half the prescribed addition value. In this way, the adjustment relates to a portion of the meridian line of the lens which is close to the reference point for far vision, between this point and the reference point for near vision. Preferably, the first optical power deviation is between 0.25 and 0.75 dioptry, or between 10% and 40% of the prescribed addition value.

Preferably, the first intermediate direction is determined in the step /f/ so that the angular distance between this direction and the reference direction for far vision is all the greater when the wearer does not lower the head much when switching from the first visual task to the second visual task.

In accordance with an advantageous implementation of the invention, a first gain value may be calculated in the step /f/ for the wearer, according to a first function of a variation between two first angles of inclination of the head of the wearer which are measured respectively while he performs the first and second tasks in succession. The first intermediate direction is then determined so that an angular distance between the reference direction for far vision and the first intermediate direction varies according to a second function of the first gain value. The first or second function is increasing, and the other is decreasing.

Preferably, the first gain is equal to a division of the variation between two first angles of inclination of the head which are measured respectively during the first and second tasks, by a lowering angle corresponding to the gaze of the wearer. The second function is then decreasing, relative to the first gain.

According to a refinement of the invention, the method may also make it possible to adjust the variations of the optical power of the progressive power lens above the reference point for near vision, on the meridian line in the direction of the reference point for far vision, or even the height of the reference point for near vision on this line. For this, the method may also comprise the following steps, which are executed between the steps /a/ and /g/:

/b'/ when the wearer is seated at a desk, presenting third visual signals above the desk, at a first placement corresponding to a position of a computer data display screen, the third visual signals being adapted to prompt a third visual task;

/c'/ for the wearer, staying seated at said desk and performing the third visual task;

/d'/ presenting fourth visual signals on the desk in front of the wearer, at a second placement corresponding to a sheet of paper placed on the desk and read by the wearer, the fourth visual signals being adapted to prompt a fourth visual task;

/e'/ measuring second angles of inclination of the head of the wearer in a vertical plane while the wearer performs the third task then the fourth task; and /f'/ from the second angles of inclination of the head of the wearer measured in the step /e'/ and for a second fixed deviation of the optical power relative to the prescribed optical power value for near vision, said second deviation being less than half the prescribed addition value, determining a second intermediate direction of sight through the lens intersecting the meridian line between the reference direction for far vision and the reference direction for near vision, including this last direction, this second intermediate direction being associated with the prescribed optical power value for near vision minus said second optical power deviation.

The lens is then produced in the step /g/ so as to also obtain, for the second intermediate direction which is determined in the step /f'/, a fourth optical power value which corresponds to the prescribed value for near vision minus the second optical power deviation.

The adjustment of this refinement is therefore done by modifying a direction of sight through the lens, for which the optical power is less than the second deviation which is fixed, at the value which is prescribed for near vision. This second optical power deviation, relative to the optical power value which is prescribed for near vision, is less than half the prescribed addition value. In this way, the additional adjustment which is provided by the refinement relates to a portion of the meridian line of the lens which is close to the reference point for near vision. Preferably, the second optical power deviation is between 0 and 0.5 dioptry, or between 0% and 30% of the prescribed addition value, the zero limit values being included.

Preferably, the second intermediate direction is determined in the step /f'/ such that the angular distance between this second intermediate direction and the first intermediate direction is all the greater when the wearer does not lower the head much when switching from the third visual task to the fourth visual task, for a first intermediate direction which remains constant.

In particular, the second optical power deviation may be zero. In this case, the second intermediate direction which is adjusted is merged with the reference direction for near vision. The refinement then culminates in an adjustment of the height of the reference point for near vision along the meridian line of the lens.

According to an advantageous embodiment of the refinement, a second gain value can be calculated in the step /f'/ for the wearer, according to a third function of a variation between two second angles of inclination of the head of the wearer which are measured respectively while he performs the third and fourth tasks in succession. The second intermediate direction may then be determined such that an angular distance between the first intermediate direction and this second intermediate direction varies according to a fourth function of the second gain value. The third or the fourth function is increasing, and the other is decreasing.

Preferably, the second gain is equal to a division of the variation between two second angles of inclination which are measured respectively during the third and fourth tasks, by a corresponding variation between angles of inclination of the gaze of the wearer. The fourth function is then decreasing, relative to the second gain.

The invention also proposes a system for measuring a variation of inclination of the head of a subject, which comprises:
  a vertical support;
  a display device for first visual signals, mounted on the support so that a height of said display device can be adjusted to the level of the eyes of the subject when said subject is standing in front of the display device, the first visual signals being adapted to prompt a first visual task for the subject;
  a projection device for second visual signals, suitable for projecting the second visual signals onto the ground at a determined distance in front of the support, in response to an initiation of projection, and the second visual signals being suitable for prompting a second visual task for the subject; and
  at least one sensor, suitable for measuring angles of inclination of the head of the subject in a vertical plane during a display of the first visual signals and then during a projection of the second visual signals.

Such a system is suitable for implementing a method for producing a customized progressive power ophthalmic lens as described previously.

According to a refinement of the system, it may also comprise a range finder which is suitable for measuring the distance between the subject and the display device for the first visual signals. The system may then also comprise an initiating device which is suitable for initiating operation of the projection device for the second visual signals when the distance between the wearer and the display device for the first visual signals, which is measured by the range finder, becomes less than a fixed threshold distance. Such automated operation allows for faster and more accurate measurements.

Furthermore, the projection device for the second visual signals and possibly the range finder may be mounted on the support, so as to facilitate installation or movement of the complete system.

BRIEF DESCRIPTION OF THE SEVERAL
VIEWS OF THE DRAWINGS

Other particular features and advantages of the present invention will become apparent from the following description of nonlimiting exemplary implementations, with reference to the appended drawings, in which.

Figure 1A:
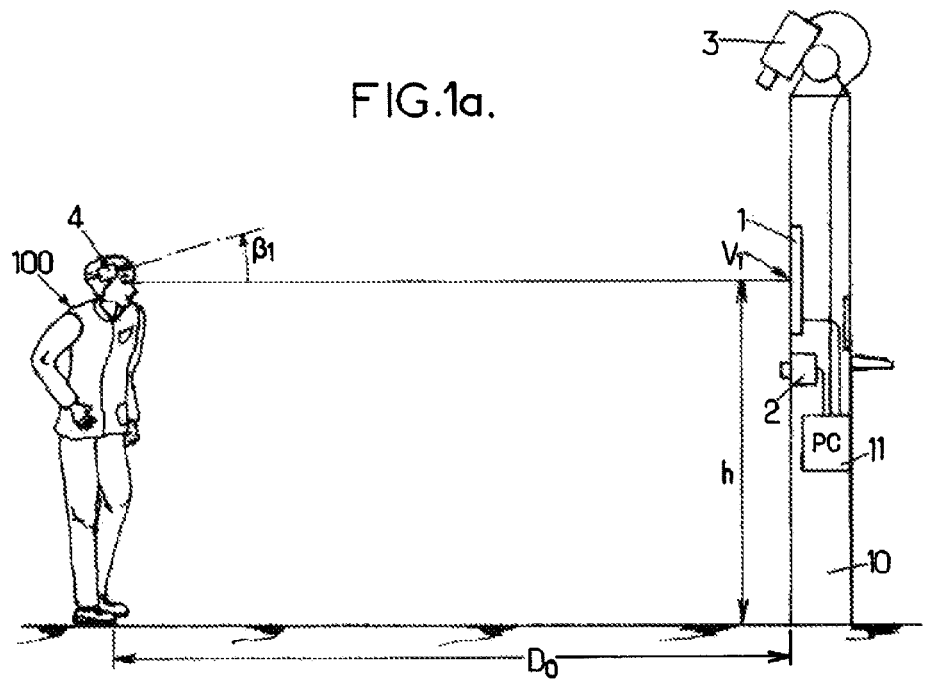
FIGS. 1a and 1b illustrate two steps of a method according to a first embodiment of the invention.
Figure 1B:
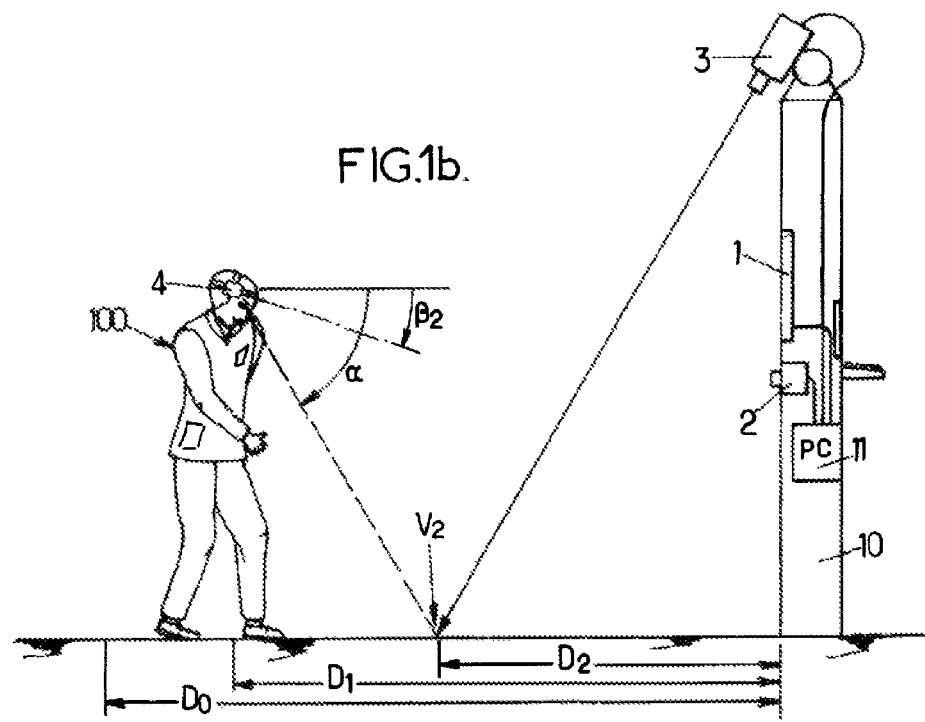
Figure 3A:
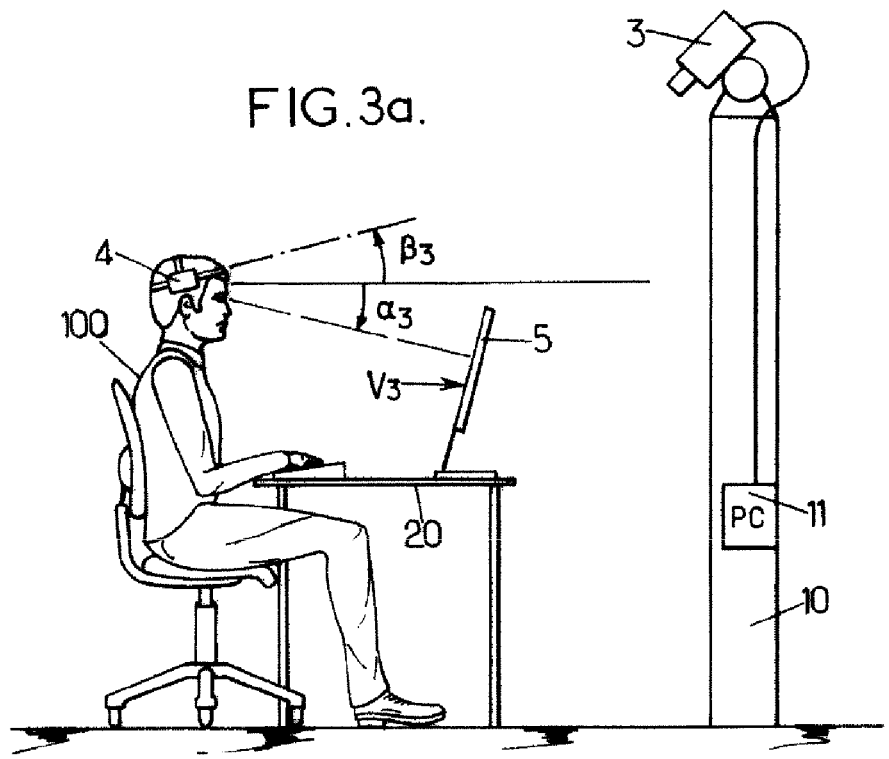
FIGS. 3a and 3b illustrate two steps of a refinement of the invention, applied to the first embodiment of FIGS. 1a and 1b.
Figure 3B:
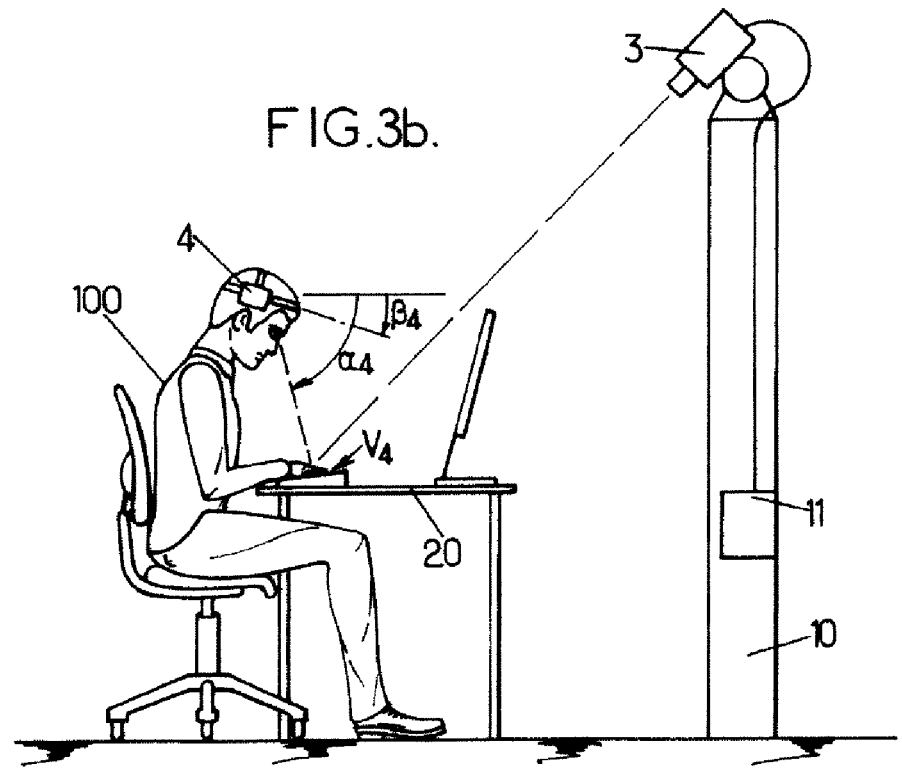
Figure 5A:
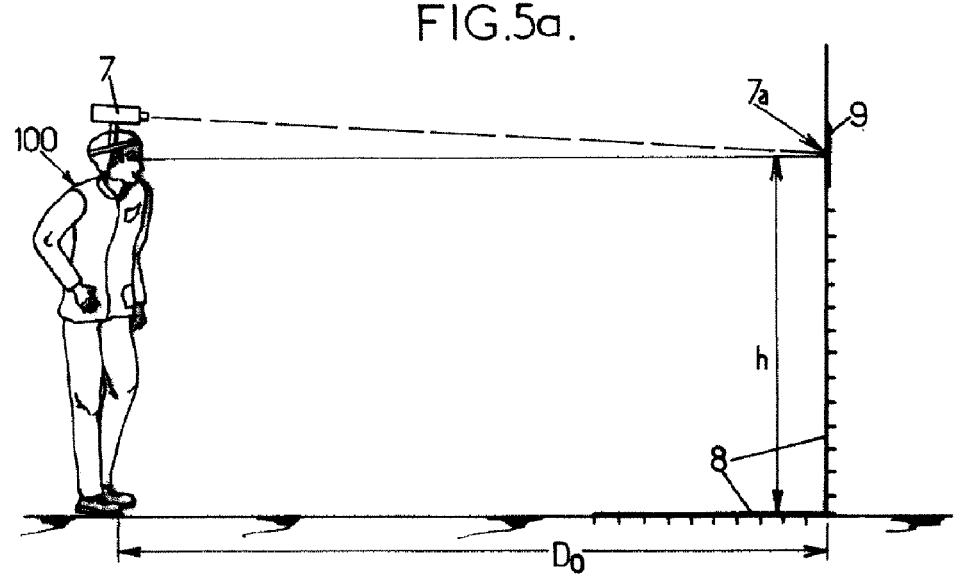
Figure 5B:
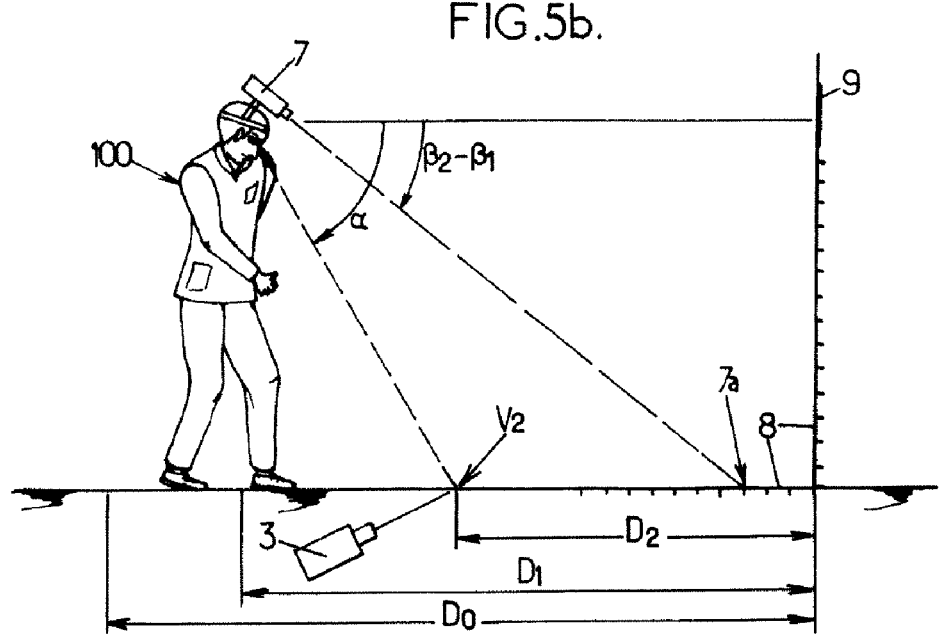
Figure 6A:
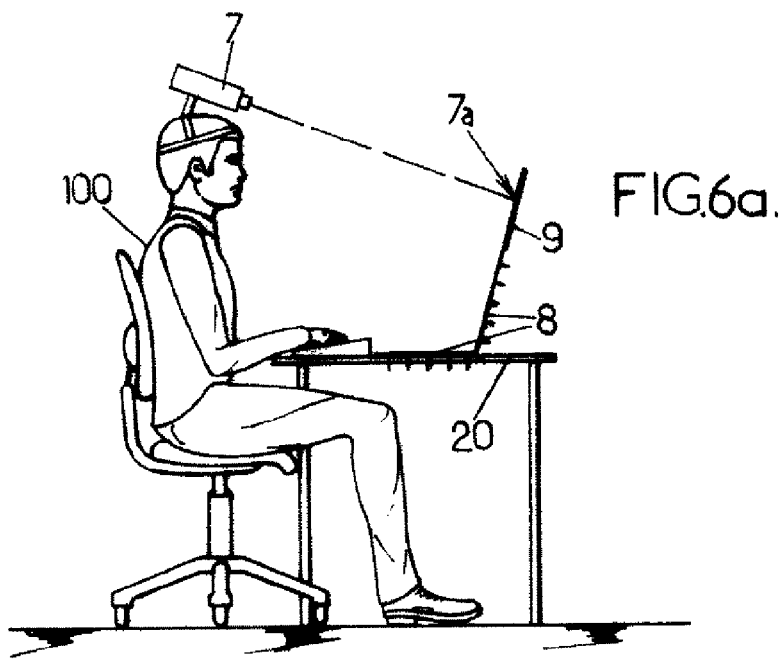
Figure 6B:
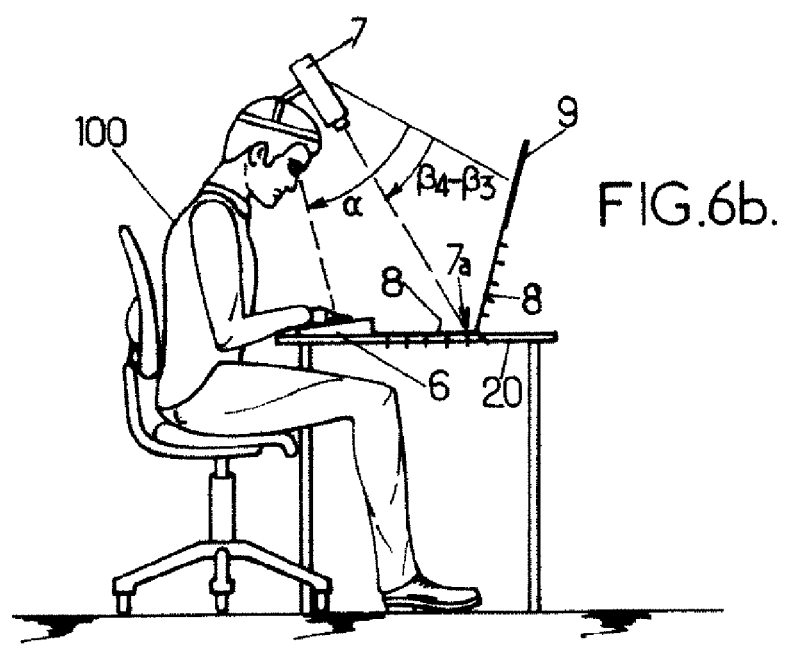

FIGS. 5a and 5b correspond to FIGS. 1a and 1b respectively for a second embodiment of the invention; and FIGS. 6a and 6b correspond to FIGS. 3a and 3b respectively for the second embodiment of the invention of FIGS. 5a and 5b.

DETAILED DESCRIPTION

According to FIGS. 1a and 1b, a display device 1 is mounted on a vertical support 10. The device 1 may be, for example, a liquid crystal display screen which is controlled by a computer unit. This computer unit is denoted PC in the figures and referenced 11. It may advantageously be incorporated in the support 10, so as to form a measuring system which is compact and which can be used easily by an optician. The computer unit 11 is suitable for controlling a display of first visual signals $V_1$ on the device 1. The signals $V_1$ are chosen to fix the attention of a subject. These signals may be, for example, a disk of more than 5 cm diameter whose color varies randomly at a frequency of 2 hertz, for example. The color of the disc can be easily identified by the subject even if he has an ametropy and is not fitted with corrective glasses. Itemizing or counting the colors constitutes an exemplary first visual task promptd by the signals $V_1$.

The support 10 is also equipped with a range finder 2 and a projection device 3, which are also connected to the computer unit 11. The range finder 2 is oriented in the same direction as the display device 1, so as to determine in real time the distance at which a subject is located in front of the device 1, when the subject is walking toward the support 10.

The device 3 may be a commercial image projector, which is oriented to project second visual signals $V_2$ onto the ground in front of the support 10. It is also controlled by the computer unit 11. In particular, the unit 11 initiates operation of the device 3 when the subject is located at a distance from the device 1 which is less than a first reference distance, denoted $D_1$. In other words, when the subject is located at a distance from the display device 1 which is greater than $D_1$, the projection device 3 is off. As soon as the subject is located at a distance from the display device 1 which is less than $D_1$, the projection device 3 projects the second signals $V_2$ onto the ground, at a second distance $D_2$ in front of the device 1, measured horizontally. The signals $V_2$ may be a succession of digits or numbers which vary randomly, large enough to be able to be read without difficulty, even without ophthalmic correction glasses. Reading these digits or numbers is an example of a second visual task promptd by the signals $V_2$.

The subject 100 whose head movements are being measured is equipped with a sensor 4 which is suitable for measuring, at each instant, the angle of inclination of his head in a vertical plane. For this, the sensor 4 is fixed on a head set which is adjusted so as to be firmly attached to the head when said head is moved by the subject. Several types of sensors can be used, which are known and commercially available. They may be liquid-based tilt sensors, optical sensors, inertial sensors, or ultrasound sensors, in particular.

Before beginning the measurements on the subject 100, the display device 1 is adjusted height-wise, so as to be located substantially at the eye height of the subject 100 when said subject is standing in front of the support 10. Thus, the direction of the gaze of the subject 100 is horizontal, when looking at the first visual signals $V_1$. The adjustment of the height of the device 1 may be done in numerous ways, manually or automatically. According to a particularly simple method, the subject is placed in front of the support 10 and looks at his reflection in a vertical mirror which is placed in front of the screen of the device 1. The device 1 is then displaced vertically along the support 10 until the subject 100 sees the reflection of his eyes which is superimposed on a reference point for the position of the visual signals $V_1$.

The subject 100 initially stands in front of the support 10, at an initial distance $D_0$ from the latter. A straight line can be drawn on the ground in front of the support 10, of length $D_0$, to set the direction of movement of the subject during the measurements.

The initial distance $D_0$ is preferably greater than 4 m (meters), for example equal to 5 m, so that the subject can walk unhindered toward the support 10.

Preferably, the first distance $D_1$ and the second distance $D_2$ have between them a difference which is between 1 and 3 m. In these conditions, the observation of the second visual signals $V_2$ by the subject 100 when he approaches the device 1 to a distance less than $D_1$ is representative of common situations. For example, $D_1$ may be equal to 3.5 m and $D_2$ may be equal to 1.5 m, so that the difference $D_1-D_2$ is equal to 2 m.

The unit 10 causes the first signals $V_1$ to be presented and the subject 100 performs the first visual task (FIG. 1a). Simultaneously, the subject 100 walks steadily towards the support 10 from the initial distance $D_0$. The angle of inclination of his head in a vertical plane is then measured. When the subject 100 reaches the distance $D_1$ (FIG. 1b), the unit 11 initiates the projection of the second visual signals $V_2$ and the subject 100 continues to advance, but while now performing the second visual task. For this, he lowers his gaze by spontaneously leaning his head forward, in an amplitude which varies between different subjects. A new measurement of the angle of inclination of his head in the vertical plane is then carried out.

A first gain $G_1$ can then be calculated according to the equation (1) hereinbelow, to characterize the relative amplitude of the inclination of the head of the subject 100 relative to the lowering of his gaze, when he switches from the first to the second task:

$$G_1 = \frac{\beta_2 - \beta_1}{\alpha} \quad (1)$$

in which $\beta_1$ and $\beta_2$ designate the angles measured for the inclination of the head when the subject performs the first visual task, and when he performs the second visual task, respectively. In other words, $\beta_1$ is the value measured before the subject 100 arrives at the distance $D_1$ from the device 1, and $\beta_2$ is the value measured after he has approached the device 1 to a distance which is less than $D_1$. $\alpha$ designates the lowering angle of the gaze of the subject 100 when he switches from the first visual task to the second visual task. Conveniently, the horizontal direction, parallel to the ground, can be taken as the origin for the angles of inclination of the head. The angle α of lowering of the gaze can be calculated by using the following equation (2)

$$\tan\alpha = \frac{h}{D_1 - D_2} \quad (2)$$

in which h is the height of the eyes of the subject 100 relative to the ground onto which the visual signals $V_2$ are projected.

The movement of the subject 100 from the initial distance $D_0$ toward the support 10 can be repeated, in order to obtain several values for the gain $G_1$ and to calculate an average value thereof.

For a subject who moves only his eyes when switching from the first task to the second task, the value of the gain $G_1$ is zero since the inclination of the head would remain constant. Conversely, for a subject who moves only his head in the same circumstances, the value 1 is obtained for the gain $G_1$.

When the subject 100 is to be fitted with a new ophthalmic progressive power lens, a first intermediate direction of gaze through the lens can be determined from the value of the gain $G_1$ which is obtained for this subject. This first intermediate direction is denoted $R_1$ and characterizes, for the final lens, the variation of the optical power when the subject 100, the future wearer of the lens, lowers his gaze from the reference direction for far vision. For example, the first intermediate direction $R_1$ may be associated with a first deviation $e_1$ of 0.5 dioptry, of the optical power relative to the optical power value which is prescribed for this wearer for far vision. The direction $R_1$, which is thus defined by the corresponding optical power value, can be determined by using a fixed variation law that is a function of the value of the gain $G_1$. This variation law is fixed such that the direction $R_1$ varies by intersecting the meridian line of the lens between the two reference directions for the far and near visions, with an angular distance relative to the reference direction for far vision which decreases with the value of $G_1$.

For example, when the optical power deviation $e_1$ is equal to 0.5 dioptry, the direction $R_1$ may be situated at an angular distance which is situated between 15° and 25° (degrees) below a direction of gaze passing through a lens mounting cross when the value of $G_1$ is zero. For the same 0.5 dioptry value for the deviation $e_1$, and when $G_1$ is equal to unity, the angular distance between the direction $R_1$ and the direction of gaze which passes through the mounting cross may be less than 1°.

Figure 2:
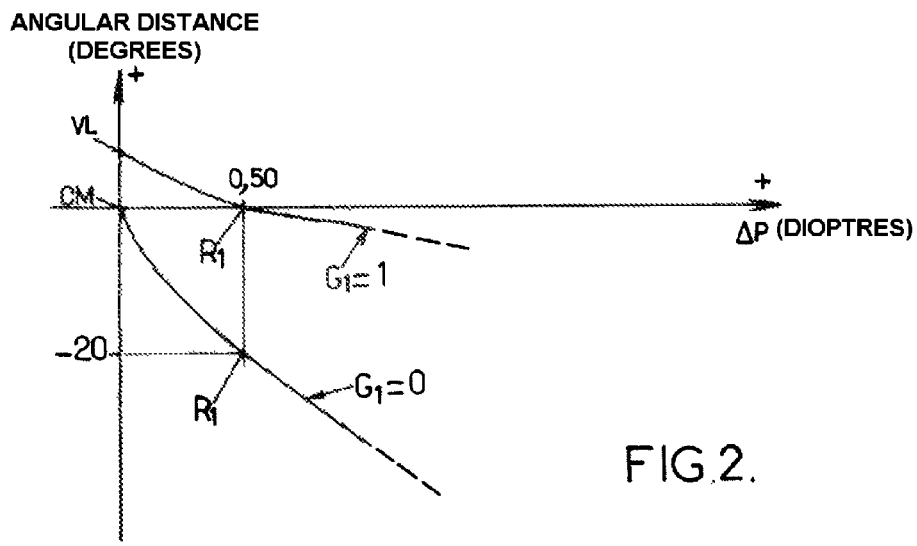
FIG. 2 illustrates a customization of a progressive power lens, obtained by using the invention.

In particular, the direction $R_1$ may pass 20° below the lens mounting cross when $G_1$ is zero, and through the lens mounting cross when $G_1$ is equal to unity. FIG. 2 illustrates the customization of the progressive power lens which is thus obtained.

FIG. 2 represents the variations of the optical power of the progressive power lens along the meridian line. The x axis shows in dioptries these optical power variations, taking for the origin the value for the reference direction for far vision. The y axis shows in degrees the angular distance between each direction of gaze through the lens and the direction which passes through the lens mounting cross, along the meridian line. As is known, the lens mounting cross, which is used to fit the lens in a frame, corresponds to the horizontal direction of gaze. Usually, it is situated at 8° below the reference direction for far vision. Each direction of gaze through the lens passes through the center of rotation of the eye when the head of the wearer is immobile, and through a corresponding point of the lens. CM, VL and VP respectively designate the direction of gaze which passes through the mounting cross, the reference direction for far vision and the reference direction for near vision. The angular distance of a direction of gaze through the lens relative to the direction CM is positively oriented toward the top of the lens. Practically, an angular distance of 20° corresponds to a linear distance of approximately 10 mm (millimeters) on the lens along the meridian line.

The law of decreasing variation of the absolute distance between the directions $R_1$ and CM, as a function of the value of $G_1$, can be any law. For example, the angular deviation between these directions may follow a linear law of the type: ($R_1$−CM) in degrees=−20×(1−$G_1$). Other variation laws can alternatively be used. The value of the angular deviation ($R_1$−CM) which is thus obtained for the value of $G_1$ determined for the wearer constitutes a customization of the progressive power lens, over and above the production of the optical prescription.

To increase the reliability of this customization of the progressive power lens which is provided by the invention, all of the method which has just been described can be executed several times independently of one another. Preferably, it may be executed five times in succession. The visual signals which are used advantageously differ between successive iterations, in order for the subject to maintain an attention that is constant and reaction times that are identical. The lens can then be produced using an average value of the directions $R_1$ which are obtained during the respective iterations, for the same deviation $e_1$.

The direction $R_1$ which has been determined according to the invention for the future wearer of the progressive power lens can be taken into account in a number of ways to produce the lens.

According to a first method, at least one surface of the lens can first be calculated, so as to obtain optical power values for the direction VL, the direction $R_1$ and the direction VP, which respectively correspond to the prescribed value for far vision, this prescribed value for far vision added to the deviation $e_1$, and the prescribed value for near vision. Such a calculation is assumed to be known per se as to its method, which is not repeated here. The surface of the glass is then machined in accordance with the results of the calculation.

According to a second method, the production of the lens may itself comprise the following substeps:
selecting a lens design from a set of available lens designs, according to the prescribed optical power values for far vision and addition, and such that a lens corresponding to the selected design has a progression length which is between 15° and 25°;
producing the lens in accordance with the selected design;
determining a height of the lens relative to the eye of the wearer, such that the point of the lens which corresponds to the prescribed optical power value for far vision added to the deviation $e_1$ corresponds to the direction $R_1$ which has been determined for the wearer; then
trimming the lens in accordance with a receptacle of a frame which has been selected for the wearer, the lens mounting cross being vertically offset relative to a reference point of the receptacle of the frame, so as to obtain the height of the lens relative to the eye which has been previously determined.

One advantage of this second method lies in the fact that an existing lens design is used with no additional calculation. The lens is simply assembled with the frame by offsetting it vertically, so as to obtain the desired optical power value for the direction of gaze $R_1$.

In the context of this description, the expression "progression length" should be understood to mean the angular distance which separates the two reference directions for far vision and for near vision.

Finally, a third method for producing the lens uses a database, which combines lenses corresponding to variable prescribed values at least for the optical power in far vision conditions and for the addition, and to variable directions for which the optical power corresponds to the prescribed value for far vision added to the deviation $e_1$. A lens is then selected from this database, which corresponds to the prescription of the wearer and for which the prescribed value for far vision added to the deviation $e_1$ corresponds to the direction $R_1$ which has been determined for the wearer. The lens which is thus selected is physically produced, in a manner known per se, from the data in the database for this lens.

A refinement of the invention will now be described, which provides an additional customization of the progressive power lens, according to the wearer for whom it is intended. This additional customization relates to the variation of the optical power in the bottom portion of the progression length, close to the reference direction for near vision. Possibly, it may be used to determine this reference direction for near vision itself.

For this refinement, a second series of measurements of inclination of the head of the wearer is carried out, in near or intermediate vision conditions. For this second series of measurements, the wearer may again be fitted with the same head set with tilt sensor as previously.

As represented in FIGS. 3a and 3b, the subject 100 sits at a desk 20, with a display screen 5 which is placed in front of him on the desk. The screen 5 may be positioned according to the usual relevant recommendations, to avoid having the subject feel an annoying tiredness when he watches the screen for a long time. The screen 5 may also be controlled by the computer unit 11, so as to present to the subject third visual signals $V_3$ which are intended to be watched or read by the subject. These third signals $V_3$ are, for example, words displayed on the screen 5, the reading of which constitutes a third visual task for the subject 100. While he performs this third task, the angle of inclination of his head is measured, and the value obtained is denoted $\beta_3$ (FIG. 3a).

There are then presented to the subject, who remains seated at the desk 20, fourth visual signals $V_4$ on the desk 20 itself, in the position of a written sheet of paper which would be placed on the desk and that the subject would be reading. These fourth signals $V_4$ may be words, and may be projected once again using the projector 3, for example. Alternatively, the fourth signals $V_4$ may be presented by a screen incorporated in the desk top 20 in front of the subject 100, in the position of the sheet of paper. The reading of the words presented on the desk 20 constitutes a fourth visual task for the subject 100. While he performs this fourth task, the angle of inclination of his head is once again measured, and the value obtained is denoted $\beta_4$ (FIG. 3b). Preferably, the subject 100 does not get up between the third and fourth tasks.

A second gain value $G_2$ is then calculated, for near vision, according to the following equation (3):

$$G_2 = \frac{\beta_4 - \beta_3}{\alpha_4 - \alpha_3} \quad (3)$$

in which $\alpha_3$ and $\alpha_4$ designate the angles between the directions of the gaze of the subject 100 while he performs the third and then the fourth tasks, respectively, and a reference direction. The horizontal direction may again be taken as a reference for the measured angles. The values of $\alpha_3$ and $\alpha_4$ may be determined by geometrically characterizing the positions that are adopted in succession by the subject 100 while he reads the signals $V_3$ then $V_4$.

A zero value which is obtained for the gain $G_2$ indicates that the subject only lowered his eyes, without lowering his head, when he switched from the third to the fourth visual task. Conversely, a result which is equal to unity for the gain $G_2$ indicates that the subject only lowered his head, without moving his eyes.

From the gain value $G_2$ which is obtained for the future wearer of the progressive power lens, a second intermediate direction of gaze through the lens is determined and denoted $R_2$. The direction $R_2$ intersects the meridian line between the reference direction for far vision, VL, and the reference direction for near vision, VP. It is associated with the optical power value which is prescribed for near vision, minus a fixed deviation denoted $e_2$.

The deviation $e_2$ may be non-zero, for example equal to 0.25 dioptry. In this case, the reference direction for near vision VP may be fixed, and the determination of the direction $R_2$ constitutes a customized adjustment of the variation of the optical power above the direction VP. Such an adjustment can be made, from the fixed direction VP, in the same way as that done by using the first intermediate direction $R_1$ from the direction VL. Notably, the law of variation of the absolute angular distance between the directions CM and $R_2$ is preferably decreasing as a function of the gain $G_2$.

It is now assumed that the deviation $e_2$ is set at the zero value. In this case, the optical power which is associated with the direction $R_2$ becomes identical to the optical power value which is prescribed for the direction VP, which means that the two directions VP and $R_2$ are merged. The reference direction for near vision VP then becomes variable, and its determination constitutes the additional customization which is provided by the refinement of the invention.

The adjustment of the direction VP is then done such that the angular distance between the direction of gaze which passes through the mounting cross, CM, and the direction VP is a decreasing function of the gain value $G_2$. Furthermore, the direction VP is advantageously situated at an angular distance which is between 35° and 45° from the direction CM when the gain value $G_2$ is zero. When the gain value $G_2$ is equal to unity, the direction VP may be situated at an angular distance from the direction $R_1$ which is between 15° and 25°, toward the bottom of the progressive power lens.

Figure 4:
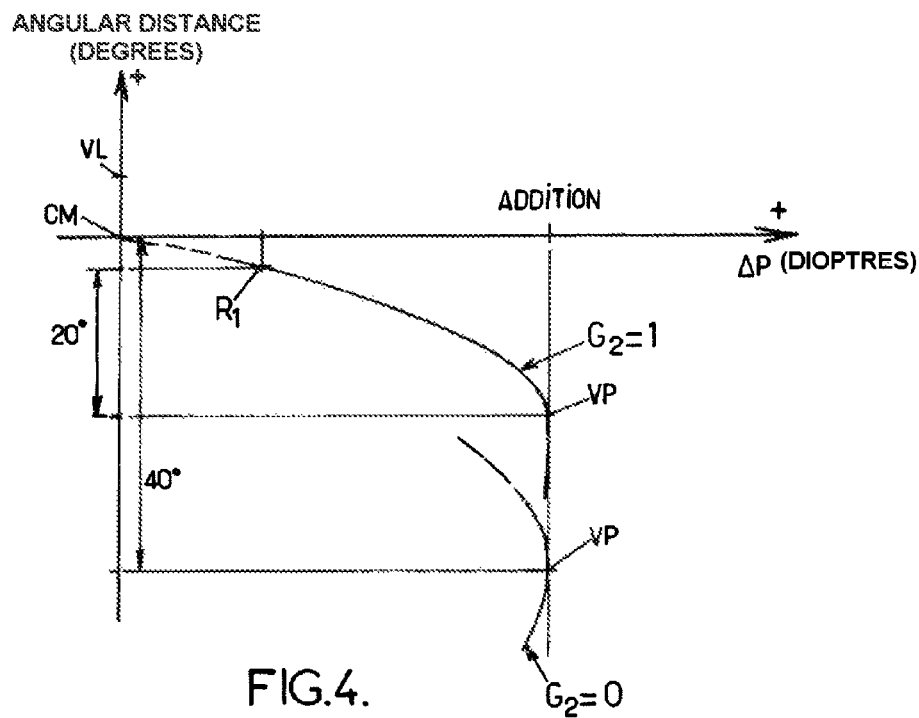
FIG. 4 illustrates an additional customization of a progressive power lens, obtained by using the refinement of FIGS. 3a and 3b.

FIG. 4 was created using the same conventions as FIG. 2. It shows two extreme positions of the direction VP, which relate to wearers for whom the values 0 and 1 of the gain $G_2$ have been obtained. In this figure, the angular deviation CM-$R_2$ is equal to 40° for $G_2$=0, and the angular deviation $R_1$-$R_2$ is equal to 20° for $G_2$=1.

However, the variation of the direction $R_2$, possibly merged with the direction VP, as a function of the gain $G_2$ can be limited in order to maintain a progression length which is sufficient to produce good comfort in the use of the lens by the wearer. In particular, the angular distance between the directions $R_1$ and VP may be advantageously kept greater than or equal to 20°.

Furthermore, the angular distance between the directions CM and VP may be limited by the height of the receptacle of the frame, in which the lens is intended to be fitted. In these circumstances, the angular distance between the directions CM and VP may be kept less than a maximum values for low values of $G_2$, close to zero. Typically, the angular distance between the two directions CM and VP may be maintained for the this reason between 35° and 45° when the value of $G_2$ is zero.

In the same way as for the direction $R_1$, the direction $R_2$ may be determined independently in a number of takes, by repeating the steps which are illustrated by FIGS. 3a and 3b and calculating the gain $G_2$. The lens is then produced by using an average value of the directions $R_2$ which are thus obtained for the successive iterations.

In the case where the refinement that has just been described is used, the lens is produced in one of the ways that has already been described, ensuring that, in addition, the optical power value for the direction $R_2$ corresponds to the value which is prescribed for near vision minus the deviation $e_2$. When the deviation $e_2$ is zero, the lens is produced such that the direction VP exhibits the angular distance that has been determined relative to the direction CM or relative to the direction $R_1$.

According to another refinement of the invention that is independent of the preceding one, and that may possibly be combined with the latter, another customization of the lens may also consist in adapting to the wearer lateral regions of the lens which extend on either side of the meridian line of the lens. The unintentional astigmatism is distributed in these lateral regions, such that the far, near and intermediate vision regions are almost without any such unintentional astigmatism. The lens may then be produced so as to also obtain these lateral regions with extensions for them which have been determined for the wearer.

The implementation of the invention that is now described is compatible with equipment for the subject 100 and a measuring system which are simplified.

According to this new implementation, the wearer is equipped, on his head, with a light source which is suitable for producing a light beam in front of the head of the subject. The light beam is inclined by movements of the head of the subject in the vertical plane. In this case, the angles of inclination of the head of the subject, while he performs any of the visual tasks that have been itemized, can be measured from positions of a spot which is formed by the light beam on a screen situated in front of the subject. For example, the sensor 4 may be replaced by a laser source 7 on the head set with which the subject 100 is equipped. In order to more easily measure the angles of inclination of the head, an appropriate graduation 8 may be provided in front of the subject 100.

FIGS. 5a and 5b show such an implementation for the steps of FIGS. 1a and 1b. The graduation 8 is vertical and extends below a target 9 which corresponds to its origin, and to which it is joined. The graduation 8 and the target 9 may be simply suspended on a wall. Possibly, the graduation 8 may be continued along the ground. The target 9 is initially adjusted to the height of the eyes of the subject. Furthermore, an initial inclination of the laser source 7 on the head set 4 can be adjusted, to compensate for a height deviation between the source 7 and the eyes of the subject 100.

The display device 1 may be eliminated, as may the computer unit 11. The first visual task then consists, for the subject 100, while walking toward the target 9 from the initial distance $D_0$, in controlling the inclination of his head so as to maintain the light spot 7a on the target 9 (FIG. 5a). When he arrives at the horizontal distance $D_1$ from the target 9, an operator initiates the presentation of the second visual signals $V_2$ by the projection device 3. If necessary, the projection device 3 may be mobile, and held by the operator who directs it toward the ground so that the visual signals $V_2$ are projected at the distance $D_2$ in front of the target 9. When he performs the second visual task, the subject 100 may lower the head, such that the light spot 7a which is produced by the source 7 is displaced downward, along the graduation 8 (FIG. 5b). Reading the position of the light spot 7a on the graduation 8, during the second visual task, directly gives the value of the difference $\beta_2-\beta_1$ to be introduced into the equation (1). The other elements for implementation of the invention are not modified with respect to the description given with reference to FIGS. 1a, 1b and 2.

FIGS. 6a and 6b illustrate the implementation of the refinement concerning near vision, with the light source 7 which replaces the sensor 4. In these figures, references that are the same as those of elements that have already been introduced designate the same elements. The display screen 5 is replaced by the target 9, in an identical position on the desktop 20. The graduation 8 extends between the target 9 and the written sheet 6 which is placed on the desk 20, just in front of the subject 100 so that he can read it. The third visual task consists, for the subject 100, in placing the light spot 7a at the center of the target 9, and the fourth visual task consists in reading the sheet 6. Reading the position of the light spot 7a on the graduation 8, during the fourth visual task, gives the value of the difference $\beta_4-\beta_3$ to be introduced into the equation (3). The other elements of implementation of the refinement of the invention are not modified relative to the description given with reference to FIGS. 3a, 3b and 4.

It is understood that the implementations of the invention that have been described in detail hereinabove may be adapted, while retaining certain advantages of the invention. In particular, the calculation formulae that have been given for the gains $G_1$ and $G_2$ may be modified.

Furthermore, the physical implementations that correspond to FIGS. 1a and 1b can be mixed with those of FIGS. 5a and 5b. For example, the first visual signals $V_1$ which are produced by the display device 1 may be used while the subject 100 is provided with a head set with light source. The reading of the signals $V_1$ then again constitutes the first visual task and the light beam now serves only to determine the variation of inclination of the head of the subject.

In the same way, the third visual signals $V_3$ which are produced by the screen 5 may also be used when the subject 100 is provided with the head set with light source.

Finally, the graduation 8 and/or the target 9 may be replaced, in the implementation of FIGS. 5a, 5b and 6a, 6b by any screen that makes it possible to detect the movements of the light spot 7a. For example, such a screen may, alternatively, be a linear light intensity detector which is adapted to directly produce an indication of the movement of the spot 7a between two successive detection initiations.

The invention claimed is:

1. A method for producing a customized progressive power ophthalmic lens intended for an identified wearer, the lens having variable optical power values along a determined meridian line on said lens, between a reference direction for far vision and a reference direction for near vision, said method comprising the following steps:

/a/ for the wearer, obtaining a prescribed optical power value for far vision and a prescribed addition value, a sum of the prescribed optical power value for far vision with the prescribed addition value providing a prescribed optical power value for near vision; and /b/ presenting first visual signals at an eye height of the wearer when standing, the first visual signals being adapted to prompt a first visual task;

/c/ for the wearer, walking toward the first visual signals from an initial distance measured horizontally relative to said first visual signals, while performing the first visual task;

/d/ when the wearer arrives at a first distance from the first visual signals, less than the initial distance, presenting second visual signals on the ground between the wearer and said first visual signals, at a second distance measured horizontally from the first visual signals and less than said first distance, the second visual signals being adapted to prompt a second visual task, the wearer then switching from the first task to the second task;

/e/ measuring first angles of inclination of the head of the wearer in a vertical plane while said wearer performs the first task then the second task; and /f/ from the first angles of inclination of the head of the wearer measured according to the step /e/ and for a fixed first deviation of the optical power relative to the prescribed optical power value for far vision, said first deviation being less than half the prescribed addition value, determining a first intermediate direction of sight through the lens intersecting the meridian line between the reference direction for far vision and the reference direction for near vision, said first intermediate direction being associated with the prescribed optical power value for far vision added to said first deviation;

/g/ producing the lens so as to obtain, for the following directions through the lens:
   for the reference direction for far vision: a first optical power value corresponding to the prescribed value for far vision, and
   for the reference direction for near vision: a second optical power value corresponding to the prescribed value for near vision,
wherein step /g/ includes obtaining in the lens, for the first intermediate direction determined in the step /f/, a third optical power value corresponding to said prescribed value for far vision added to the first deviation.

2. The method as claimed in claim 1, wherein the first intermediate direction is determined in the step /f/ so that an angular distance between said first intermediate direction and the reference direction for far vision is all the greater when the wearer does not lower the head much when said wearer switches from the first visual task to the second visual task.

3. The method as claimed in claim 1, wherein the first optical power deviation is between 0.25 and 0.75 diopters, or between 10% and 40% of the prescribed addition value.

4. The method as claimed in claim 1, wherein a difference between the first and second distances is between 1 and 3 meters.

5. The method as claimed in claim 1, wherein, in step /f/, a first gain value is calculated for the wearer, according to a first function of a variation between two first angles of inclination of the head of the wearer which are measured respectively while said wearer performs the first and second tasks in succession,
   and wherein the first intermediate direction is determined so that an angular distance between the reference direction for far vision and said first intermediate direction varies according to a second function of said first gain value,
   one of said first and second functions being increasing, and the other of said first and second functions being decreasing.

6. The method as claimed in claim 5, wherein the first optical power deviation relative to the prescribed optical power value for far vision is equal to 0.5 diopters, and wherein the first intermediate direction is situated at an angular distance of between 15° and 25° below a direction of gaze passing through a lens mounting cross when the first gain value is zero, and at an angular distance less than 1° from said direction of sight, passing through the mounting cross when the first gain value is equal to unity.

7. The method as claimed in claim 1, wherein the steps /b/ to /f/ are executed several times so as to independently determine several first intermediate directions, and wherein the step /g/ is executed using an average value of the first intermediate directions obtained for the respective successive iterations of the steps /b/ to /f/.

8. The method as claimed in claim 1, wherein the step /g/ itself comprises the following substeps:
   calculating at least one surface of the lens, so as to obtain optical power values for the reference direction for far vision, the first intermediate direction and the reference direction for near vision, which correspond respectively to the prescribed value for far vision, said prescribed value for far vision added to the first optical power deviation, and the prescribed value for near vision; then
   machining said surface of the lens in accordance with the results of the calculation.

9. The method as claimed in claim 1, wherein the step /g/ itself comprises the following substeps:
   /g1/ selecting a lens design from a set of available lens designs, according to the prescribed optical power values for far vision and addition, and such that a lens corresponding to the selected design has a progression length of between 15° and 25°;
   /g2/ producing the lens in accordance with the selected design;
   /g3/ determining a height of the lens relative to the eye of the wearer, such that a point of the lens corresponding to the prescribed optical power value for far vision added to the first optical power deviation corresponds to the first intermediate direction determined for the wearer in the step /f/; then
   /g4/ trimming the lens in accordance with a receptacle of a frame selected for the wearer, a mounting cross of the lens being vertically offset relative to a reference point of the receptacle of the frame, so as to obtain the height of the lens relative to the eye determined in the substep /g3/.

10. The method as claimed in claim 1, wherein the step /g/ itself comprises the following substeps:
   obtaining a lens database corresponding to variable prescribed values at least for the optical power in far vision conditions and for the addition, and to variable directions for which the optical power corresponds to the prescribed value for far vision added to the first optical power deviation;
   from said data base, selecting a lens corresponding to the prescribed optical power value for far vision and to the prescribed addition value, and for which the prescribed optical power value for far vision added to the first deviation corresponds to the first intermediate direction determined for the wearer in the step /f/; and
   producing the selected lens in accordance with the data in the database for said lens.

11. The method as claimed in claim 1, wherein the wearer is fitted, on his head, during the steps /b/ to /e/, with at least one sensor suitable for measuring the angle of inclination of the head in the vertical plane while said wearer performs the first visual task then the second visual task.

12. The method as claimed in claim 1, wherein the wearer is equipped, on his head, during the steps /b/ to /e/, with a light source which is suitable for producing a light beam in front of said wearer, so that said light beam is inclined by movements of the head of the wearer in the vertical plane, and wherein a variation between two first angles of inclination of the head of the wearer while said wearer performs the first task then the second task, respectively, is measured from positions of a spot formed by the light beam on a screen situated in front of the wearer.

13. The method as claimed in claim 1, also comprising the following steps, executed between the steps /a/ and /g/:
/b'/ when the wearer is seated at a desk, presenting third visual signals above the desk, at a first placement corresponding to a position of a computer data display screen, the third visual signals being adapted to prompt a third visual task;
/c'/ for the wearer, staying seated at said desk and performing the third visual task;
/d'/ presenting fourth visual signals on the desk in front of the wearer, at a second placement corresponding to a sheet of paper placed on the desk and read by the wearer, the fourth visual signals being adapted to prompt a fourth visual task;
/e'/ measuring second angles of inclination of the head of the wearer in a vertical plane while said wearer performs the third task then the fourth task; and
/f'/ from the second angles of inclination of the head of the wearer measured in the step /e'/ and for a second fixed deviation of the optical power relative to the prescribed optical power value for near vision, said second deviation being less than half the prescribed addition value, determining a second intermediate direction of sight through the lens intersecting the meridian line between the reference direction for far vision and the reference direction for near vision, including said reference direction for near vision, said second intermediate direction being associated with the prescribed optical power value for near vision minus said second optical power deviation;
and wherein a lens is produced in the step /g/ so as to also obtain, for the second intermediate direction determined in the step /f'/, a fourth optical power value corresponding to said prescribed value for near vision minus the second optical power deviation.

14. The method as claimed in claim 13, wherein the second intermediate direction is determined in the step /f'/ such that an angular distance between said second intermediate direction and the first intermediate direction determined in the step /f/ is all the greater when the wearer does not lower the head much when said wearer switches from the third visual task to the fourth visual task, the first intermediate direction remaining constant.

15. The method as claimed in claim 13, wherein the second optical power deviation is between 0 and 0.5 diopters, or between 0% and 30% of the prescribed addition value, including said zero limit values.

16. The method as claimed in claim 13, wherein, in the step /f'/, a second gain value is calculated for the wearer, according to a third function of a variation between two second angles of inclination of the head of the wearer measured respectively while said wearer performs the third and fourth tasks in succession,
and wherein the second intermediate direction is determined such that an angular distance between the first intermediate direction and said second intermediate direction varies according to a fourth function of said second gain value,
one of said third and fourth functions increasing, and the other of said third and fourth functions being decreasing.

17. The method as claimed in claim 16, wherein the second optical power deviation relative to the prescribed optical power value for near vision is zero, such that the second intermediate direction is merged with near vision direction, and is situated at an angular distance of between 35° and 45° from a direction of sight which passes through a lens mounting cross when the second gain value is zero, and at an angular distance of between 15° and 25° from the first intermediate direction determined in the step /f/ when the second gain value is equal to unity, toward the bottom of the progressive lens.

18. The method as claimed in claim 13, wherein the steps /b'/ to /f'/ are executed several times so as to independently determine several second intermediate directions, and wherein the step /g/ is executed by using an average value of the second intermediate directions obtained respectively for the successive iterations of the steps /b'/ to /f'/.

19. The method as claimed in claim 13, wherein the wearer is equipped, on his head, during the steps /b'/ to /e'/, with at least one sensor suitable for measuring the inclination of the head in the vertical plane while said wearer performs the third visual task then the fourth visual task.

20. The method as claimed claim 13, wherein the wearer is equipped, on his head, during the steps /b'/ to /e'/, with a light source suitable for producing a light beam in front of said wearer, such that said light beam is inclined by movements of the head of the wearer in the vertical plane, and where a variation between two second angles of inclination of the head of the wearer while said wearer performs the third task then the fourth task, respectively, is measured from positions of a spot formed by the light beam on a screen situated in front of the wearer.

21. The method as claimed in claim 1, wherein the lens is also produced in the step /g/ such that lateral regions of said lens containing an unintentional astigmatism distribution have determined extensions for the wearer, on either side of the meridian line of the lens.

22. A system for measuring a variation of inclination of the head of a subject, comprising:
a vertical support;
a display device configured to display first visual signals adapted to prompt a first visual task for the subject, the display device being mounted on the support so that a height of said display device can be adjusted to the level of the eyes of the subject when said subject is standing in front of the display device;
a projection device configured to project second visual signals onto the ground at a determined distance in front of the support, in response to an initiation of projection, and the second visual signals being suitable for prompting a second visual task for the subject; and
at least one sensor, suitable for measuring angles of inclination of the head of the subject in a vertical plane during a display of the first visual signals then during a projection of the second visual signals.

23. The system as claimed in claim 22, wherein the projection device for the second visual signals is mounted on the support.

24. The system as claimed in claim 22, also comprising:
a range finder configured to measure a distance between the subject and the display device for the first visual signals; and
an initiating device configured to initiate operation of the projection device for the second visual signals when the distance between the subject and the display device for the first visual signals, measured by the range finder, becomes less than a fixed threshold distance.

25. The system as claimed in claim 24, wherein the range finder is mounted on the support.

* * * * *